United States Patent Office 3,533,961
Patented Oct. 13, 1970

3,533,961
METHOD OF PRODUCING SPHERICAL PELLETS OF ACTIVATED CARBON
Andries Voet and Trevor George Lamond, Borger, Tex., assignors to J. M. Huber Corporation, Locust, N.J., a corporation of New Jersey
No Drawing. Filed Feb. 7, 1966, Ser. No. 525,319
Int. Cl. C01b 31/08
U.S. Cl. 252—421                2 Claims

ABSTRACT OF THE DISCLOSURE

A method of producing spherical pellets of granulated activated carbon is disclosed. The method includes the steps of dry mixing of powdered carbonaceous material with powdered pitch, introducing water in a finely divided state and agitating the mixture until pellets of the desired size are formed followed by drying, charring and activating of the mixture at elevated temperatures.

---

The present invention realtes to a method of producing spherical granules of activated carbon.

Basically two forms of activated carbon are in common use, these being powdered and granulated. In general the powdered form is mixed with the product being purified and is later filtered out and thrown away. The granulated form is arranged to permit the material being treated to be passed therethrough and when sufficiently contaminated may be economically regenerated to permit its reuse.

Three properties are particularly important in the production of acceptable activated carbon in the granulated form. These properties are hardness of the granules, their apparent or bulk density, and their resistance to flow of fluids and/or gases per unit of weight of activated carbon when packed in a column.

One of the important methods of producing granulated activated carbon in the prior art is by crushing of compressed blocks producing irregularly shaped and sized particles. Another prior art method is the extrusion of cylindrically shaped particles. In each of these prior art methods particles of equal density will produce a lower bulk density and a higher resistance to flow of fluids and/or gases than that for particles of a spherical shape.

A prior art system for producing spherical particles of carbonaceous material to be carbonized and activated subsequently was developed by the use of a system of two binders as exemplified by U.S. Pat. No. 2,648,637. This system while producing spherical particles is cumbersome and difficult as well as expensive to carry out, since two types of binders are needed, requiring constant careful supervision. Moreover, such pellets may only be produced in a batch process, in view of their requirement of starting and termination of granule growth by additions, followed by screening of the product obtained to remove undersized and oversized granules.

The primary object of the invention is to produce spherical granules of activated carbon of a uniform size in a continuous process.

Another object of the invention is to produce spherical granules of activated carbon which uses only a single binder material in a continuous process.

A still further object of the invention is to produce spherical granules of activated carbon by a continuous process which is inexpensive in operation producing activated carbon granules of economic importance.

Other objects and advantages of the invention will become apparent in the following specification when considered in light of the attached claims.

We have discovered, and it is upon this discovery that our invention is predicated, that uniformly sized spherical granules of carbon can be prepared by means of a continuous process using only a single binder material. Moreover, the fully continuous process of our invention produces the spherical granules with sufficient green strength to be introduced by automatic equipment into drying, carbonizing and activating furnaces. The basic steps of our process consist of first mixing the powdered dry carbonaceous materials with the powdered binder in suitable proportions. The mixture is then introduced into a pin mixer which consists of a substantially horizontal cylindrical drum having a rotatable shaft concentrically mounted therein. A plurality of rods are attached radially to the shaft to rotate therewith. The powder is delivered to the feed end of the pin mixer and is moved continuously longitudinally through the mixer towards the discharge end, due to the arrangement of the radial rods mounted on the shaft. Coincident with the introduction of the mixture of carbonaceous material and binder, water is sprayed onto the mixture at the feed end of the pin mixer at an accurately proportioned rate. The moistened powder forms agglomerates, which build up into spherical granules of uniform size. The granules are discharged from the pin mixer and are then conveyed into a drying-carbonizing furnace followed by conveyance into an activation furnace.

The quantity of water required in the wetted mixture depends on the type and particle size of the carbonaceous material. Quantities as low as 30% by weight may produce pellets. Generally, however, quantities of water of 40% by weight or over are preferred. Quantities of water over 55% by weight often lead to plastic mixtures which do not pelletize properly. In general, it is preferable to introduce water in an amount to form 30 to 55% by weight of the mixture.

The process of our invention is not restricted to the use of the described pin mixer. A variety of mixers can be used. For instance, so-called disc pelletizers operate equally well as pin mixers in the process of our invention. In short, any system of rotational agitation will induce pelletization in the mixture of this invention. The pin mixer is the preferred embodiment, in view of the simplicity of control in the continuous process of pelletization.

The preferred binder of our invention is coal tar pitch derived from high temperature coking of coal. Other suitable pitches, for practicing the invention, are coal tar pitch derived from low-temperature coking of coal, pitch derived from wood carbonization, and petroleum residue pitch. Pitches suitable for use in the invention must have a softening point above about or in excess of 80° C. and and such may be used equally in practicing the invention. The term "pitch" as used in the specification and claims specifically includes and is limited to the pitches set forth in this paragraph.

Coal tar pitch is obtained from coking of coal. Coal tar is the oily fraction obtained by destructive distillation of coking coal at elevated temperatures. By removal of a variety of fractions from the coal tar, such as crude naphtha, light oil, light creosote, heavy creosote and anthracene oils, the pitch remains as the residue.

It is possible that coal tar pitch is produced "in situ" if the carbonaceous material used is a coking type of coal. The processes of drying and carbonization, followed by activation, produces coal tar pitch in situ. Thus, if the carbonaceous material is in part or in total a coking coal, the quantity of binder to be added in the process of our invention may be very much reduced and could even be entirely dispensed with, in view of the relatively large quantities of pitch (40–60%) contained in the coal tar present in coking coal and produced in situ.

The quantity of binder required in the process of our invention depends greatly on the nature of the carbonaceous material. In particular, it depends on particle size and structure and is clearly related to the oil absorption value of the carbonaceous material. Thus, when a carbon black with a very fine particle size and a high oil absorption is used as the carbonaceous material, quantities of 60 to 70% by weight of pitch may be required. The same particle size carbon blacks with a low oil absorption may require only 40% by weight of pitch, while coarser particle size blacks may require only as little as 20% pitch. Generally, coarse materials such as ground anthracite, ground carbonized wood and similar materials require 10–20% by weight of pitch in the process of our invention. As previously discussed, coking bituminous coal may be operative in the process of our invention with less binder or without any binder added at all, in view of the formation of the required pitch in situ upon heating and activation. From the above discusion it is clear that in forming the dry mixture of carbonaceous material and pitch that, in the absence of the formation of equivalent amounts of pitch in situ, at least 10% by weight of the dry mixture of pitch must be added to form a suitable binder.

The examples set forth below describe specific embodiments of the invention but do not limit the invention.

EXAMPLE 1

A type of carbon black known as General Purpose Furnace Black (GPF) of a mean particle diameter of 50 millimicrons, is mixed in equal quantities by weight with a powdered coal tar pitch, of a softening point, cube-in-air, of about 120° C. The mixture was then introduced into a pin mixer while simultaneously a finely divided water spray was introduced at such a rate that the amount of water present in the wetter mixture of carbon black and coal tar pitch was equal to 48% by weight. Spherical pellets were formed of sizes predominantly falling between U.S. standard sieves 4 and 10. The pellets were dried, carbonized and activated with steam at 925° C., resulting in a hard, abrasion-resistant granular activated carbon.

EXAMPLE 2

Powdered low volatile bituminous coal was mixed in a quantity of 90 parts by weight with 10 parts by weight of a coal tar pitch of a softening point, cube-in-air, of about 140° C. The mixture was then introduced into a pin mixer while simultaneously a finely divided water spray was introduced at such a rate, that the amount of water present in the wetted mixture was equal to 52% by weight. Spherical pellets were formed of sizes falling between U.S. standard sieves 6 and 12. The pellets were dried, carbonized and activated with carbon dioxide at 975° C., resulting in a hard, abrasion-resistant granular activated carbon.

EXAMPLE 3

Example 2 was repeated except that powdered anthracite coal was substituted for the bituminous coal. The pellets obtained were spherical, of a particle size predominantly between U.S. standard sieves 3½ and 6. The product was a hard abrasion-resistant granular activated carbon.

EXAMPLE 4

A type of carbon black known as High Abrasion Furnace Black (HAF) of a mean particle diameter of 28 millimicrons, was mixed in a quantity of 45 parts by weight with 55 parts by weight of a powdered coal tar pitch of a softening point, cube-in-air, of about 120° C. This mixture was then introduced into a pin mixer while simultaneously a finely divided water spray was introduced at such a rate that the amount of water present in the wetted mixture was 51% by weight. Spherical pellets were formed of sizes predominantly falling between U.S. standard sieves 10 and 40. The pellets were dried, carbonized and activated with steam at 925° C., resulting in a hard, abrasion-resistant granular activated carbon.

EXAMPLE 5

An oak charcoal obtained by a conventional carbonization process, was ground to 200 mesh and above. Of this ground charcoal, 80 parts were mixed with 20 parts by weight of a coal tar pitch of a softening point, cube-in-air, of 120° C. This mixture was then introduced into a pin mixer while simultaneously a finely divided spray of water was introduced at such a rate that the amount of water present in the wetted mixture was 46% by weight. Spherical pellets were formed of sizes falling between U.S. standard sieves 4 and 8. The pellets were dried, carbonized and activated with steam at 950° C., resulting in a hard, abrasion-resistant granular activated carbon.

Other charcoals such as those derived from maple, hickory and birch were also used in repetitions of Example 5 with similar results.

EXAMPLE 6

Powdered medium-volatile coking bituminous coal was introduced into a pin mixer, while simultaneously a finely divided water spray was introduced at such a rate that the amount of water present in the wetted mixture was equal to 40% by weight. Spherical pellets were formed of sizes falling between U.S. standard sieves sizes 4 and 8. The pellets were dried, carbonized and activated with steam at 975° C., resulting in a hard abrasion-resistant granular activated carbon.

These examples were repeated using combinations of the carbonaceous materials with virtually identical results.

Pellets prepared according to this invention are of a spherical form. Their sizes can be regulated by the rate of throughput of the wetted mixture in the pin mixer. Longer residence times in the pin mixer produced by lower r.p.m.'s of the shaft lead to larger pellets.

Having thus described the preferred embodiments of the invention it should be understood that numerous adaptations may be resorted to without departing from the scope of the appended claims.

We claim:

1. The method of producing spherical pellets of granulated activated carbon in which a carbonaceous material capable of being activated is pelletized and thereafter dried, charred and activated, wherein the improvement comprises a continuous process for producing spherical pellets of granulated activated carbon of a uniform size which consists of; dry mixing powdered carbonaceous material capable of being activated and at least 10 percent by weight of said dry mixture of powdered pitch having a cube-in-air softening point in excess of 80° C., agitating said mixture while introducing water in a finely divided state into said mixture, said water being introduced in an amount to form 30–55 percent by weight of the wetted mixture, continuing said agitation until spherical pellets of the desired size are formed by agglomeration and thereafter drying, charring and activating said pellets at elevated temperatures.

2. A method according to claim 1 wherein said carbonaceous material is selected from the group consisting of carbon black, bituminous coal, anthracite coal, and wood charcoal.

References Cited
UNITED STATES PATENTS

| | | | |
|---|---|---|---|
| 1,667,906 | 5/1928 | Strafford | 201—6 |
| 3,009,863 | 11/1961 | Angevine | 201—6 |
| 3,050,378 | 8/1962 | Kron | 23—314 |
| 3,391,234 | 7/1968 | Walenciak et al. | 264—117 |
| 2,317,026 | 4/1943 | Brown et al. | 252—445 |
| 1,530,393 | 3/1925 | Morrell. | |
| 2,648,637 | 8/1953 | Rodman | 252—421 |

DANIEL E. WYMAN, Primary Examiner

P. E. KONOPKA, Assistant Examiner

U.S. Cl. X.R.

23—209.1, 209.4, 313, 314; 252—445, 448; 264—117; 201—6, 23, 38